US008758895B2

(12) United States Patent
Dooley et al.

(10) Patent No.: US 8,758,895 B2
(45) **Date of Patent: *Jun. 24, 2014**

(54) ENGINEERED PLANT BIOMASS PARTICLES COATED WITH BIOLOGICAL AGENTS

(71) Applicant: Forest Concepts, LLC, Auburn, WA (US)

(72) Inventors: James H. Dooley, Federal Way, WA (US); David N. Lanning, Federal Way, WA (US)

(73) Assignee: Forest Concepts, LLC, Auburn, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/939,639

(22) Filed: Jul. 11, 2013

(65) Prior Publication Data

US 2013/0302614 A1 Nov. 14, 2013

Related U.S. Application Data

(63) Continuation-in-part of application No. 13/499,931, filed on Apr. 3, 2012, now Pat. No. 8,610,893, which is a continuation-in-part of application No. PCT/US2011/033584, filed on Apr. 22, 2011, which is a continuation-in-part of application No. 12/966,198, filed on Dec. 13, 2010, now Pat. No. 8,039,106, which is a continuation of application No. 12/907,526, filed on Oct. 19, 2010, now Pat. No. 8,034,449.

(60) Provisional application No. 61/343,005, filed on Apr. 22, 2010.

(51) Int. Cl.
*B32B 5/16* (2006.01)

(52) U.S. Cl.
USPC ................ 428/402; 428/15; 428/17; 428/18; 144/373; 47/9

(58) Field of Classification Search
USPC ................ 428/15, 17, 18, 402; 144/373; 47/9
See application file for complete search history.

(56) References Cited

U.S. PATENT DOCUMENTS

| | | | | |
|---|---|---|---|---|
| 1,867 | A | 11/1840 | Winans et al. | |
| 19,971 | A | 4/1858 | Wheeler | |
| 634,895 | A | 10/1899 | Manning | |
| 1,067,269 | A | 7/1913 | Palmer | |
| 1,477,502 | A | 12/1923 | Killick | |
| 2,773,789 | A | 12/1956 | Clark | |
| 3,034,882 | A | 5/1962 | Renwick | |
| 3,393,634 | A | 7/1968 | Blackford | |
| 3,396,069 | A | 8/1968 | Logan et al. | |
| 3,415,297 | A | 12/1968 | Yock | |
| 3,797,765 | A | 3/1974 | Samuels | |
| 4,364,423 | A | 12/1982 | Schilling | |
| 4,558,725 | A | 12/1985 | Veneziale | |
| 4,681,146 | A | 7/1987 | Liska et al. | |
| 5,029,625 | A | 7/1991 | Diemer | |
| 5,199,476 | A | 4/1993 | Hoden | |
| 5,215,135 | A | 6/1993 | Coakley et al. | |
| 5,441,877 | A | 8/1995 | Chiaffredo et al. | |
| 5,484,504 | A | 1/1996 | Tedders, Jr. et al. | |
| 5,505,238 | A | 4/1996 | Fujii et al. | |
| 5,518,919 | A | 5/1996 | Tyndall | |
| 5,533,684 | A | 7/1996 | Bielagus | |
| 5,750,467 | A | 5/1998 | Shasha et al. | |
| 5,842,507 | A | 12/1998 | Fellman et al. | |
| 6,575,066 | B2 | 6/2003 | Arasmith | |
| 6,682,752 | B2 | 1/2004 | Wharton | |
| 6,729,068 | B2 | 5/2004 | Dooley et al. | |
| 7,291,244 | B2 | 11/2007 | DeZutter et al. | |
| 8,034,449 | B1 * | 10/2011 | Dooley et al. | 428/402 |
| 8,158,256 | B2 * | 4/2012 | Dooley et al. | 428/402 |
| 8,317,891 | B1 | 11/2012 | Cheiky et al. | |
| 8,481,160 | B2 * | 7/2013 | Dooley et al. | 428/402 |
| 8,497,019 | B2 * | 7/2013 | Dooley et al. | 428/402 |
| 2004/0033248 | A1 | 2/2004 | Pursell et al. | |
| 2005/0025989 | A1 | 2/2005 | Brandenburg | |
| 2006/0135365 | A1 | 6/2006 | Chun | |
| 2006/0219826 | A1 | 10/2006 | Yamamoto | |
| 2007/0045456 | A1 | 3/2007 | Medoff | |
| 2009/0145563 | A1 | 6/2009 | Jarck | |
| 2010/0229465 | A1 | 9/2010 | Ahm | |

FOREIGN PATENT DOCUMENTS

| | | | |
|---|---|---|---|
| DE | 102007014293 | A1 | 10/2008 |
| EP | 0394890 | A2 | 4/1990 |
| EP | 1074532 | A2 | 7/2001 |
| EP | 1 525 965 | A2 | 4/2005 |
| EP | 2045057 | A1 | 4/2009 |
| WO | WO 9717177 | | 5/1997 |

OTHER PUBLICATIONS

International Search Report, dated Aug. 30, 2011, in International Application No. PCT/US2011/033584.

* cited by examiner

*Primary Examiner* — Leszek Kiliman
(74) *Attorney, Agent, or Firm* — Thomas F. Broderick

(57) ABSTRACT

Plant biomass particles coated with a biological agent such as a bacterium or seed, characterized by a length dimension (L) aligned substantially parallel to a grain direction and defining a substantially uniform distance along the grain, a width dimension (W) normal to L and aligned cross grain, and a height dimension (H) normal to W and L. In particular, the L×H dimensions define a pair of substantially parallel side surfaces characterized by substantially intact longitudinally arrayed fibers, the W×H dimensions define a pair of substantially parallel end surfaces characterized by crosscut fibers and end checking between fibers, and the L×W dimensions define a pair of substantially parallel top and bottom surfaces.

13 Claims, 3 Drawing Sheets

US 8,758,895 B2

ENGINEERED PLANT BIOMASS PARTICLES COATED WITH BIOLOGICAL AGENTS

STATEMENT OF GOVERNMENT LICENSE RIGHTS

This invention was made with government support by the Small Business Innovation Research program of the U.S. Department of Energy, Contract SC0002291. The United States government has certain rights in the invention.

FIELD OF THE INVENTION

Our invention relates to manufactured particles of plant biomass coated with biological agents.

BACKGROUND OF THE INVENTION

As used herein, the term "biological agent" means a living organism that can serve a desired function in a particular environment when introduced on a carrier substrate into the environment. Representative biological agents for such purposes include algae, bacteria, fungi, insect eggs, metazoan eggs, moss protonemas, plant seeds, protozoa, and viruses. By "coating" is meant the uptake and reversible retention of such a biological agent onto or within the lignocellulosic matrix of a plant biomass material.

It is well known in the art that biomass-derived materials can serve as useful carriers for biological agents. Representative examples follow.

U.S. Pat. No. 5,441,877 discloses an organic substrate containing cyanophycea (blue-green algae) and bryophyte protonemas (moss) for producing vegetation on bare land.

U.S. Pat. No. 5,51,9198 discloses admixing protozoa and bacteria with wood chips for bioremediation of contaminated soil.

U.S. Pat. No. 5,484,504 discloses attaching beneficial insect eggs to a string which is then directly applied to plants.

U.S. Pat. No. 5,750,467 discloses lignin-based pest control formulations containing *Bacillus thuringiensis* ("*B. thuringiensis*"), Baculoviridae, e.g., *Autographa californica* nuclear polyhedrosis virus, protozoa such as *Nosema* spp., fungi such as *Beauveria* spp., and nematodes.

U.S. Patent Application No. U.S. 2010/0229465 A1 discloses a germination and plant growth medium of processed rice hull to which may be incorporated in or attached to virae, bacteria, fungi such as trichoderma, fungi spores, insect eggs such as predatory nematodes, and plant seeds.

U.S. Pat. No. 8,317,891 discloses a method of enhancing soil growth using biochar containing MycoGrow™ mycorrhizal fungi (Fungi Perfecti LLC, Olympia, Wash.).

SUMMARY OF THE INVENTION

Herein we describe a new class of plant biomass feedstock particles characterized by consistent piece size and shape uniformity, high skeletal surface area, and good flow properties. This constellation of characteristics makes the feedstock particles particularly advantageous carriers for biological agents.

The subject particles of a plant biomass material having fibers aligned in a grain are characterized by a length dimension (L) aligned substantially parallel to the grain and defining a substantially uniform distance along the grain, a width dimension (W) normal to L and aligned cross grain, and a height dimension (H) normal to W and L. In particular, the L×H dimensions define a pair of substantially parallel side surfaces characterized by substantially intact longitudinally arrayed fibers, the W×H dimensions define a pair of substantially parallel end surfaces characterized by crosscut fibers and end checking between fibers, and the L×W dimensions define a pair of substantially parallel top and bottom surfaces. The L×W surfaces of particles with L/H dimension ratios of 4:1 or less are further elaborated by surface checking between longitudinally arrayed fibers. The length dimension L is preferably aligned within 30° parallel to the grain, and more preferably within 10° parallel to the grain. The plant biomass material is preferably selected from among wood, agricultural crop residues, plantation grasses, hemp, bagasse, and bamboo.

As disclosed in the Examples, the particles are coated with biological agents using well established techniques.

DETAILED DESCRIPTION OF THE PREFERRED EMBODIMENT

We have applied engineering design principles to develop a new class of plant biomass feedstock particles with unusually large surface area to volume ratios that can be manufactured in remarkably uniform sizes using low-energy comminution techniques. The particles exhibit a disrupted grain structure with prominent end and some surface checks that greatly enhance their skeletal surface area as compared to their envelope surface area. Representative biomass feedstock particles are shown in FIGS. 1A, B, C, D, and F, which indicate how the nominal parallelepiped-shaped particles are cracked open by pronounced checking that greatly increases surface area.

The term "plant biomass" as used herein refers generally to encompass all plant materials harvested or collected for use as industrial and beanery feedstocks, including woody biomass, hardwoods and softwoods, energy crops like switch grass, misconstrues, and giant reed grass, hemp, bagasse, bamboo, and agricultural crop residues, particularly corn stover.

The term "grain" as used herein refers generally to the arrangement and longitudinally arrayed direction of fibers within plant biomass materials. "Grain direction" is the orientation of the long axis of the dominant fibers in a piece of plant biomass material.

The terms "checks" or "checking" as used herein refer to lengthwise separation and opening between plant fibers in a biomass feedstock particle. "Surface checking" may occur on the lengthwise surfaces a particle (particularly on the L×W surfaces); and "end checking" occurs on the cross-grain ends (W×H) of a particle.

The term "extent" as used herein refers to an outermost edge on a particle's surface taken along any one of the herein described L, W, and H dimensions (that is, either parallel or normal to the grain direction, as appropriate); and "extent dimension" refers to the longest straight line spanning points normal to the two extent edges along that dimension. "Extent volume" refers to a parallelepiped figure that encompasses a particle's three extent dimensions.

The term "skeletal surface area" as used herein refers to the total surface area of a biomass feedstock particle, including the surface area within open pores formed by checking between plant fibers. In contrast, "envelope surface area" refers to the surface area of a virtual envelope encompassing the outer dimensions the particle, which for discussion purposes can be roughly approximated to encompass the particle's extent volume.

The terms "temperature calibrated conductivity," "calibrated conductivity," and "CC" as used herein refer to a measurement of the conductive material in an aqueous solution adjusted to a calculated value that would have been read if the aqueous sample had been at 25° C.

Figure 1:
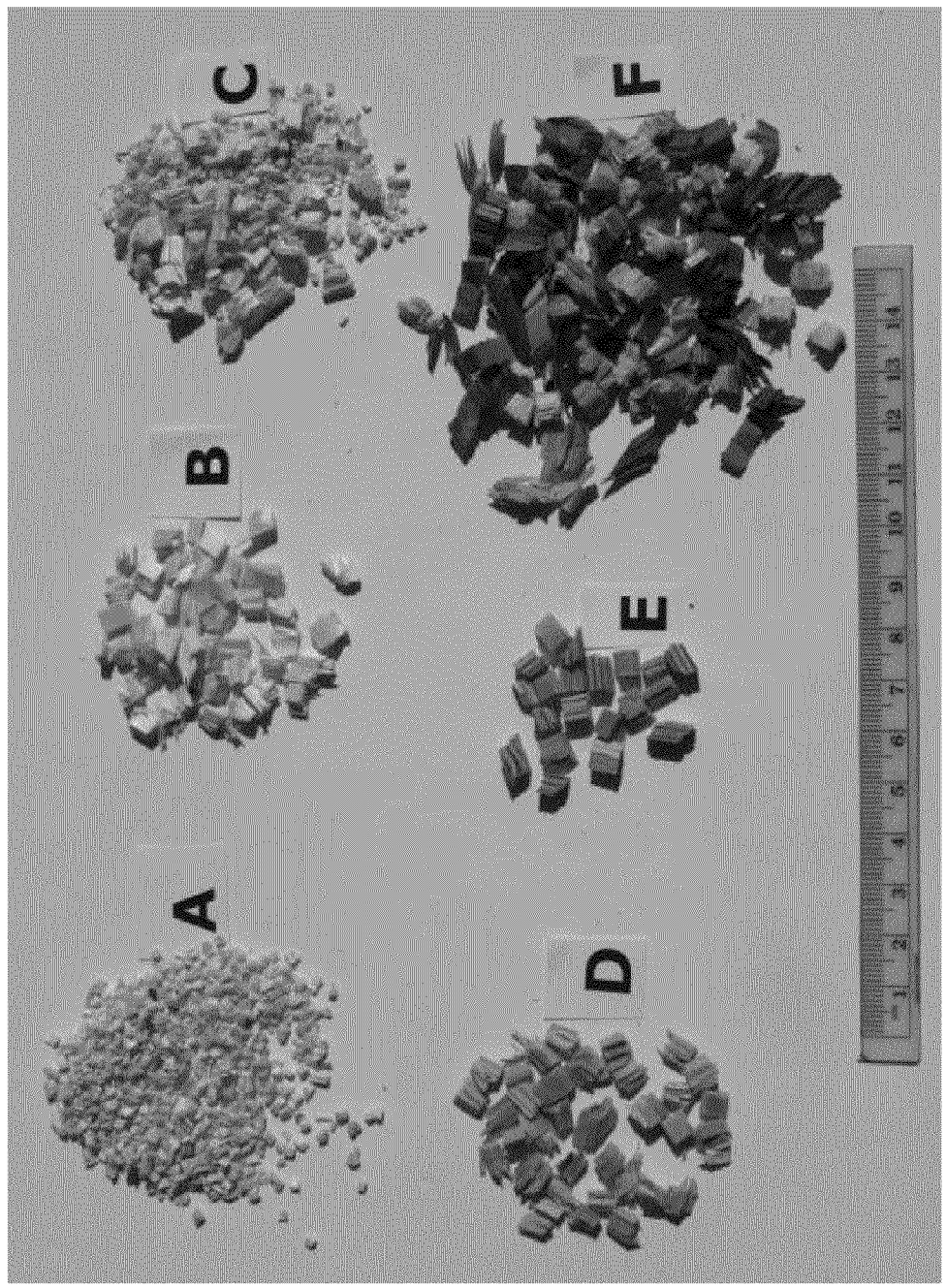
FIG. 1 is a photograph of one-gram samples of the plant biomass materials used in the experiments described in the Examples: A, 2 mm×2 mm hybrid Poplar particles; B, 4 mm×4 mm hybrid Poplar particles; C, a bimodal mixture of the 2 mm and 4 mm hybrid Poplar particles; D, 4 mm×4 mm Douglas fir particles; E, hand-sawn Douglas fir cubes; F, 4 mm cross-sheared corn stover particles.
Figure 2:
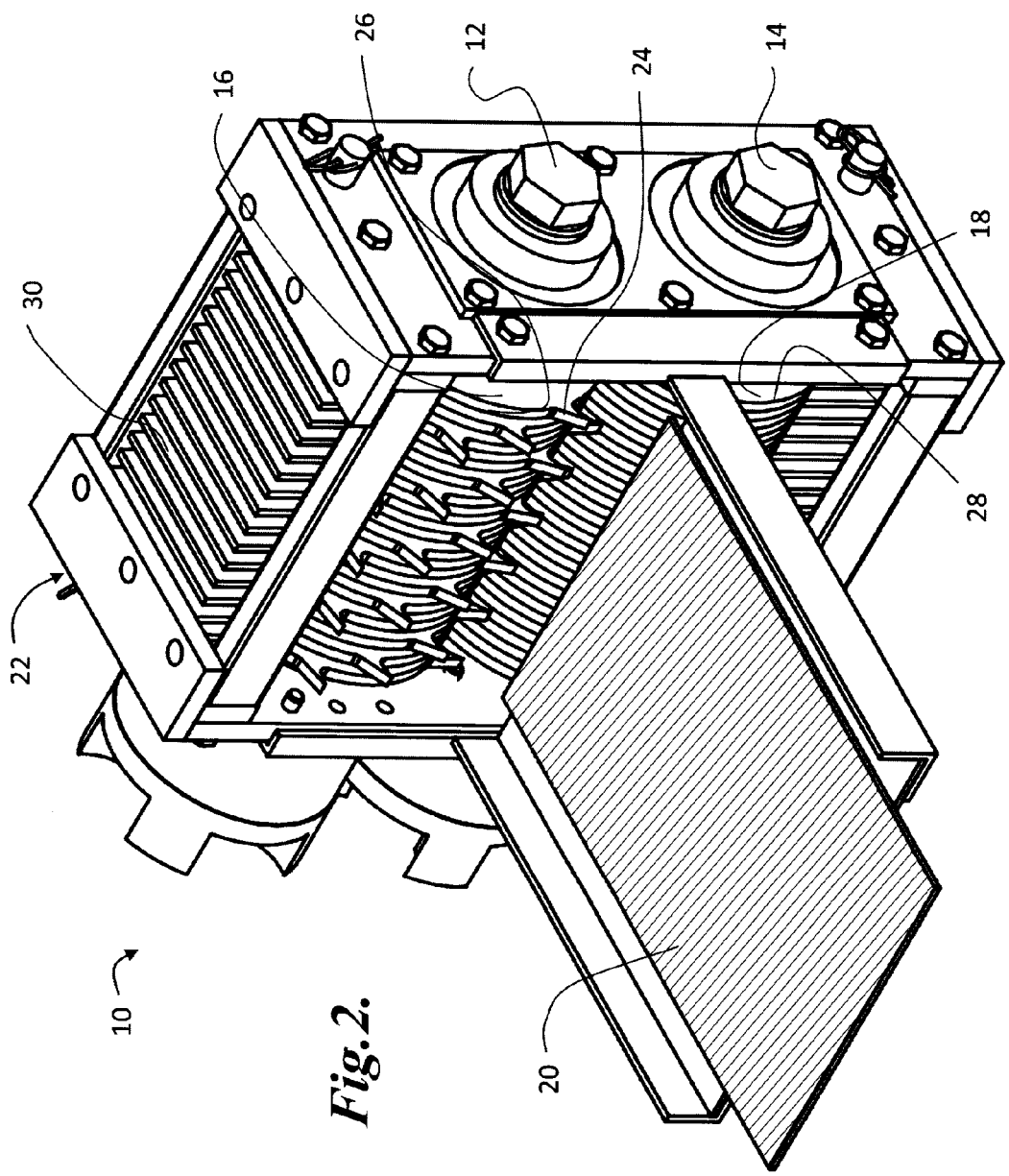
FIG. 2 is a perspective view of the prototype rotary bypass shear machine that was used to produce the plant biomass feedstock particles shown in FIGS. 1A, B, C, D, and F.

The new class of plant biomass feedstock particles described herein can be readily optimized in size, shape, and surface area to volume ratio to serve as carriers for biological agents. Representative carrier particles are shown in FIG. 1 and described in the Examples.

Each particle is intended to have a specified and substantially uniform length (L) along the grain direction, a width (W) tangential to the growth rings (in wood) and/or normal to the grain direction, and a height (H) (termed thickness in the case of veneer) radial to the growth rings and/or normal to the W and L dimensions.

We have found it very convenient to use wood veneer from the rotary lathe process as a raw material. Peeled veneer from a rotary lathe naturally has a thickness that is oriented with the growth rings and can be controlled by lathe adjustments. Moreover, within the typical range of veneer thicknesses, the veneer contains very few growth rings, all of which are parallel to or at very shallow angle to the top and bottom surfaces of the sheet. In our application, we specify the veneer thickness to match the desired wood particle height (H) to specifications for particular end-use applications.

The veneer may be processed into particles directly from a veneer lathe, or from stacks of veneer sheets produced by a veneer lathe. Plant biomass materials too small in diameter or otherwise not suitable for the rotary veneer process can be sliced to pre-selected thickness by conventional processes. Our preferred manufacturing method is to feed the veneer sheet or sliced materials into a rotary bypass shear with the grain direction oriented across and preferably at a right angle to the feed direction through the machine's processing head, that is, parallel to the shearing faces.

The rotary bypass shear that we designed for manufacture of wood feedstock particles is a shown in FIG. 2. This prototype machine 10 is much like a paper shredder and includes parallel shafts 12, 14, each of which contains a plurality of cutting disks 16, 18. The disks 16, 18 on each shaft 12, 14 are separated by smaller diameter spacers (not shown) that are the same width or greater by 0.1 mm thick than the cutting disks 16, 18. The cutting disks 16, 18 may be smooth 18, knurled (not shown), and/or toothed 16 to improve the feeding of veneer sheets 20 through the processing head 22. Each upper cutting disk 16 in our rotary bypass shear 10 contains five equally spaced teeth 24 that extend 6 mm above the cutting surface 26. The spacing of the two parallel shafts 12, 14 is slightly less than the diameter of the cutting disks 16, 18 to create a shearing interface. In our machine 10, the cutting disks 16, 18 are approximately 105 mm diameter and the shearing overlap is approximately 3 mm.

This rotary bypass shear machine 10 used for demonstration of the manufacturing process operates at an indeed speed of one meter per second (200 feet per minute). The feed rate has been demonstrated to produce similar particles at indeed speeds up to 2.5 meters per second (500 feet per minute).

The width of the cutting disks 16, 18 establishes the length (L) of the particles produced since the veneer 20 is sheared at each edge 28 of the cutters 16, 18 and the veneer 20 is oriented with the fiber grain direction parallel to the cutter shafts 12, 14 and shearing faces of the cutter disks 16, 18. Thus, wood particles from our process are of much more uniform length than are particles from shredders, hammer mills and grinders which have a broad range of random lengths. The desired and predetermined length of particles is set into the rotary bypass shear machine 10 by either installing cutters 16, 18 having widths equal to the desired output particle length or by stacking assorted thinner cutting disks 16, 18 to the appropriate cumulative cutter width.

Fixed clearing plates 30 ride on the rotating spacer disks to ensure that any particles that are trapped between the cutting disks 16, 18 are dislodged and ejected from the processing head 20.

We have found that the wood particles leaving the rotary bypass shear machine 10 are broken (or crumbled) into short widths (W) due to induced internal tensile stress failures. Thus the resulting particles are of generally uniform length (L) along the wood grain, as determined by the selected width of the cutters 16, 18, and of a uniform thickness (H, when made from veneer), but vary somewhat in width (W) principally associated with the microstructure and natural growth properties of the raw material species. Most importantly, frictional and Poisson forces that develop as the biomass material 20 is sheared across the grain at the cutter edges 28 tend to create end checking that greatly increases the skeletal surface areas of the particles. Substantial surface checking between longitudinally arrayed fibers further elaborates the L×W surfaces when the length to height ratio (L/H) is 4:1 or less, and particularly 2:1 or less.

The output of the rotary bypass shear 10 may be used as is for some end-uses such as soil amendment and industrial fiber production. However, many end-uses will benefit if the particles are screened into more narrow size fractions that are optimal for end-use applications requiring improved flow ability and decay uniformity. In that case, an appropriate stack of vibratory screens or a tubular trammel screen with progressive openings can be used to remove particles larger or smaller than desired. In the event that the feedstock particles are to be stored for an extended period or are to be fed into a conversion process that requires very dry feedstock, the particles may be dried prior to storage, packing or delivery to an end user.

We have used this prototype machine 10 to make feedstock particles in various lengths from a variety of plant biomass materials, including: peeled softwood and hardwood veneers; sawed softwood and hardwood veneers; softwood and hardwood branches and limbs crushed to a predetermined uniform height or maximum diameter; cross-grain oriented wood chips and hog fuel; corn stover; switch grass; and bamboo. The L×W surfaces of peeled veneer particles generally retain the tight-side and loose-side characteristics of the raw material. Crushed wood and fibrous biomass mats are also suitable starting materials, provided that all such biomass materials are aligned across the cutters 16, 18, that is, with the shearing faces substantially parallel to the grain direction, and preferably within 10° and at least within 30° parallel to the grain direction.

We currently consider the following size ranges as particularly useful biomass feedstocks: H should not exceed a maximum from 1 to 16 mm, in which case W is between 1 mm and 1.5×the maximum H, and L is between 0.5 and 20× the maximum H; or, preferably, L is between 4 and 70 mm, and each of W and H is equal to or less than L. Surprisingly significant percentages of the above preferably sized wood particles readily sink in water, and this presents an opportunity to selectively sort lignin-enriched particles (by gravity and/or density) and more economical preprocessing.

For flow ability and high surface area to volume ratios, the L, W, and H dimensions are selected so that at least 80% of the particles pass through a ¼ inch screen having a 6.3 mm nominal sieve opening but are retained by a No. 10 screen having a 2 mm nominal sieve opening. For uniformity as reaction substrates, at least 90% of the particles should preferably pass through: a ¼" screen having a 6.3 mm nominal sieve opening but are retained by a No. 4 screen having a 4.75 mm nominal sieve opening; or a No. 4 screen having a 4.75 mm nominal sieve opening but are retained by a No. 8 screen having a 2.36 mm nominal sieve opening; or a No. 8 screen having a 2.36 mm nominal sieve opening but are retained by a No. 10 screen having a 2 mm nominal sieve opening.

Most preferably, the subject biomass feedstock particles are characterized by size such that at least 90% of the particles pass through: a ¼ inch screen having a 6.3 mm nominal sieve opening but are retained by a ⅛-inch screen having a 3.18 mm nominal sieve opening; or a No. 4 screen having a 4.75 mm nominal sieve opening screen but are retained by a No. 8 screen having a 2.36 mm nominal sieve opening; or a ⅛-inch screen having a 3.18 mm nominal sieve opening but are retained by a No. 16 screen having a 1.18 mm nominal sieve opening; or a No. 10 screen having a 2.0 mm nominal sieve opening but are retained by a No. 35 screen having a 0.5 mm nominal sieve opening; or a No. 10 screen having a 2.0 mm nominal sieve opening but are retained by a No. 20 screen having a 0.85 mm nominal sieve opening; or a No. 20 screen having a 0.85 mm nominal sieve opening but are retained by a No. 35 screen having a 0.5 mm nominal sieve opening.

Suitable testing screens and screening assemblies for characterizing the subject biomass particles in such size ranges are available from the well-known Gilson Company, Inc., Lewis Center, Ohio, US (www.globalgilson.com). In a representative protocol, approximately 400 g of the subject particles (specifically, the output of machine 10 with ⅜"-wide cutters and ⅛" conifer veneer) were poured into stacked ½", ⅜", ¼", No. 4, No. 8, No. 10, and Pan screens; and the stacked screen assembly was roto-tapped for 5 minutes on a Gilson® Sieve Screen Model No. SS-12R. The particles retained on each screen were then weighed. Table 1 summarizes the resulting data.

TABLE 1

| | Screen size | | | | | | |
|---|---|---|---|---|---|---|---|
| | ½" | ⅜" | ¼" | No. 4 | No. 8 | No. 10 | Pan |
| % retained | 0 | 0.3 | 1.9 | 46.2 | 40.7 | 3.5 | 7.4 |

These data show a much narrower size distribution profile than is typically produced by traditional high-energy comminution machinery.

Thus, the invention provides plant biomass particles characterized by consistent piece size as well as shape uniformity, obtainable by cross-grain shearing a plant biomass material of selected thickness by a selected distance in the grain direction. Our rotary bypass shear process greatly increases the skeletal surface areas of the particles as well, by inducing frictional and Poisson forces that tend to create end checking as the biomass material is sheared across the grain. The resulting cross-grain sheared plant biomass particles are useful as carriers for biological agents, as described below.

In the following Examples, the biomass particles were coated with a conveniently traceable fertilizer as a surrogate marker using a coating technique disclosed for biological agents in the above-cited prior art.

EXAMPLES

Buckmaster recently evaluated electrolytic ion leakage as a method to assess activity access for subsequent biological or chemical processing of forage or biomass. (Buckmaster, D. R., Assessing activity access of forage or biomass, Transactions of the ASABE 51(6):1879-1884, 2008.) He concluded that ion conductivity of biomass leachate in aqueous solution was directly correlated with activity access to plant nutrients within the biomass materials.

In the following experiments, we compared ion leachate rates from various fertilizer-coated biomass particles.

Materials

Wood particles of the present invention were manufactured in the above described machine 10, using either ³⁄₁₆" or ¹⁄₁₆" wide cutters, from green veneer of thicknesses corresponding to the cutter widths. Both hybrid Poplar and Douglas fir particles were produced in this manner. Corn stover (no cobs) was cut into 100 mm billets, dehydrated, and sheared cross-grain through ³⁄₁₆" cutters.

The resulting particles were size screened. Approximately 400 g of particles were poured into stacked ⅜", No. 4, ⅛", No. 10, No. 16, No. 35, No. 50, No. 100, and Pan screens; and the stacked screen assembly was roto-tapped for 10 minutes on a Gilson® Sieve Screen Model No. SS-12R. Nominal 4 mm particles produced with the ³⁄₁₆" cutters were collected from the pass ⅜", no pass No. 4 screen. Nominal 2 mm particles produced with the ¹⁄₁₆" cutters were collected from the pass ⅛", no pass No. 16 screen.

Wood "cubes" were cut with a hand saw from ⅙" Douglas fir veneer. The veneer was sawn cross-grain into approximately ³⁄₁₆" strips. Then each strip was gently flexed by finger pressure to break off roughly parallelogram-shaped pieces of random widths. The resulting pieces were screened to collect cubes from the pass ⅜", no pass No. 4 screen. As a representative sample, the extent length and width dimensions of 15 cubes were measured with a digital caliper: the L dimensions had a mean of 7.5 mm, with a standard deviation of 1.8; and the W dimensions had a mean of 4.6 mm with a SD of 1.1.

The particle and cube samples were dehydrated to constant weight at 43° C., and subdivided into control and experimental subsamples. Control subsamples were stored in airtight plastic bags until ion conductivity analysis. The experimental subsamples were coated with liquid fertilizer using the following protocol. 50 grams of the wood particles or cubes were soaked and stirred for one hour in 800 ml of a 10× fertilizer solution prepared by dissolving 57.5 g of Miracle-Gro® Water Soluble All Purpose Plant Food 24-8-16 (Scott's, Marysville, Ohio) in 0.5 gal dH2O. 20 g of the corn stover particles were submerged and soaked in 320 ml of the 10× fertilizer solution for one hour. The fertilizer coated carriers were then drained onto a paper coffee filter and dehydrated overnight to constant weight at 43° C.

Ion conductivity was measured as follows.

Equipment

Jenco® Model 3173/3173R Conductivity/Salinity/TDS/Temperature Meter

Corning® Model PC-420 Laboratory Stirrer/Hot Plate

Aculab® Model VI-1200 Balance

Methods

Ion conductivity of leachate in aqueous solution was assessed for each subsample by the following protocol:

(1) Measure the initial temperature compensated conductivity (CC, in microSiemens (μS)) of 500 ml of distilled water maintained at ~25° C. in a glass vessel.

(2) Add a 10 g subsample of wood particles or cubes (or 5 g of corn stover particles) into the water, and stir at 250 RPM at ~25° C. for 45 minutes.

(3) Note and record the CC of the water at 15-minute intervals.

(4) Calculate an experimental CC value for comparison purposes by subtracting the initial CC from the CC at 30 minutes.

Results

Figure 3:
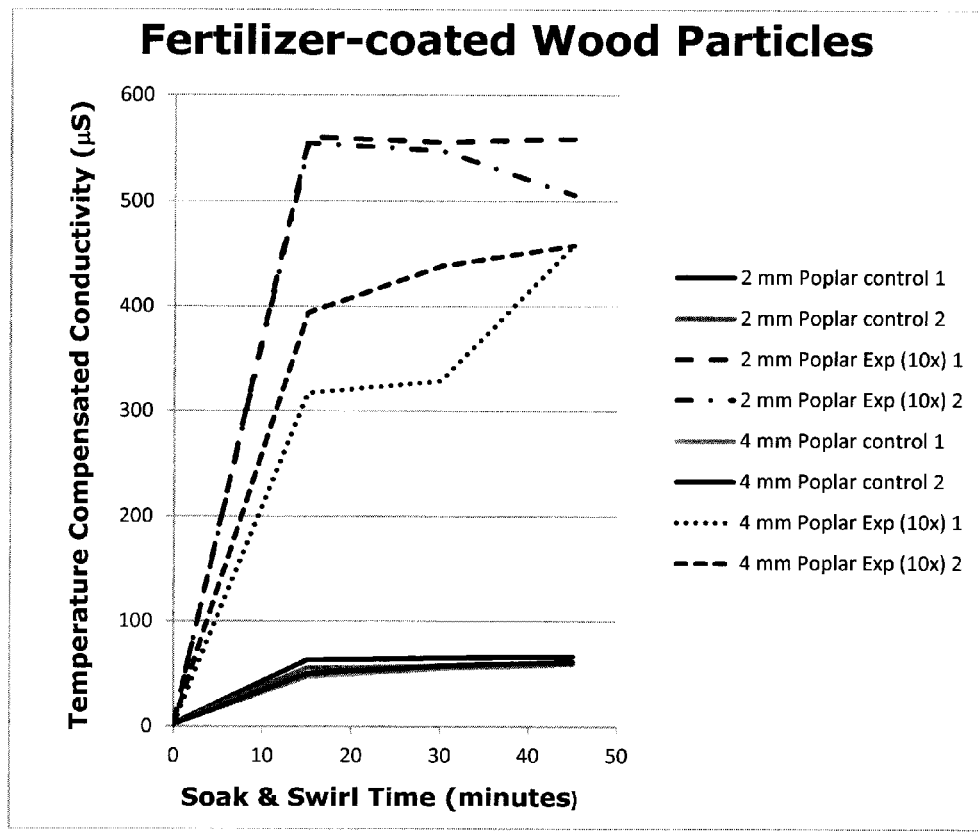
FIG. 3 is a graph of ion conductivity leachate data from exemplary fertilizer-coated wood particles described in the Examples.

The observed CC data is shown in Table 2; and the hybrid Poplar data in rows 1 through 8 of Table 2 are plotted in FIG. 3.

relatively distinct peaks identifiable by size screening). "Multimodal" indicates exhibiting a plurality of such sizes or peaks. This particular mixture had two equal size peaks, at 2 mm and 4 mm, and the resulting CC data (row 10 ) falls somewhat in between the CC data of its monomodal constituents (rows 3-4 and 7-8).

Rows 10 and 11 show CC data from uncoated and coated 4 mm particles of Douglas fir, a slow growing softwood having a somewhat higher density than fast-growing hybrid Poplar hardwood. The CC profiles of the 4 mm softwood (rows 10 and 11) and the hybrid hardwood particles (rows 7 and 8) are somewhat different, which indicates that different types of wood will exhibit different capacities to absorb/adsorb and/or release/diffuse inorganic fertilizer ions.

Rows 12 and 13 show that uncoated and coated cubes exhibit a much tighter CC uptake/release profile than wood particles (rows 10 and 11). Despite having a larger envelope volume, the cubes had an experimental CC value of 61 v. 241 for the particles. These data are consistent with the elaborated skeletal surface area of the subject particles, which are characterized by pronounced end checking and some surface checking Rows 14 and 15 show CC data from uncoated and coated 4 mm corn stover particles. These particle samples were ana-

TABLE 2

| # | Biomass Particles | Soak & Swirl Time (minutes) | | | | |
|---|---|---|---|---|---|---|
| | | 0 | 15 | 30 | 45 | |
| 1 | 2 mm hybrid Poplar control 1 | 3.0 | 63.2 | 65.2 | 66.5 | Temperature Compensated |
| 2 | 2 mm hybrid Poplar control 2 | 3.1 | 55.8 | 57.1 | 60.9 | Conductivity (μS) |
| 3 | 2 mm hybrid Poplar Exp (10x) 1 | 1.8 | 561 | 556 | 559 | |
| 4 | 2 mm hybrid Poplar Exp (10x) 2 | 2.4 | 555 | 548 | 506 | |
| 5 | 4 mm hybrid Poplar control 1 | 2.4 | 47.5 | 55.3 | 59.3 | |
| 6 | 4 mm hybrid Poplar control 2 | 2.3 | 50.3 | 57.8 | 61.6 | |
| 7 | 4 mm hybrid Poplar Exp (10x) 1 | 2.3 | 317 | 329 | 458 | |
| 8 | 4 mm hybrid Poplar Exp (10x) 2 | 2.4 | 394 | 438 | 458 | |
| 9 | Biomodal hybrid poplar Exp (10x) | 2.3 | 498 | 534 | 547 | |
| 10 | 4 mm Douglas fir control particles | 2.3 | 85.5 | 94.1 | 95.8 | |
| 11 | 4 mm Douglas fir Exp (10x) particles | 1.9 | 271 | 335 | 363 | |
| 12 | Douglas fir cubes, control | 2.2 | 55.4 | 80.3 | 95.9 | |
| 13 | Douglas fir cubes, Exp (10x) | 2.6 | 126.9 | 160.3 | 182.9 | |
| 14 | 4 mm corn stover control | 1.7 | 638 | 759 | 809 | |
| 15 | 4 mm corn stover Exp (10x) | 2.2 | 1103 | 1252 | 1326 | |

Referring to the hybrid Poplar CC data shown in rows 1 to 8 and FIG. 3, several trends are apparent. First, the fertilizer coated experimental particles released roughly 10 times more ions than the uncoated control particles. Second, 10 g of the 2 mm experimental particles released more ions than 10 g of the 4 mm experimental particles. Third, the replicate 2 mm experimental particles exhibited roughly similar CC profiles, as did the 4 mm experimental particles. From these observations we surmise that the consistent size and shape uniformity and high surface area of the subject particles foster a high and consistent coating (presumably due to diffusion-driven absorption and/or adsorption processes) of inorganic fertilizer ions to the biomass matrix, as well as to empirically determinable release rates (presumably by diffusion) after drying and exposure to moisture.

Row 9 shows CC data from a bimodal hybrid Poplar sample, in this case composed of 5 g of the 2 mm experimental 10× particles admixed with 5 grams of the 4 mm 10× experimental particles. As used herein the term "monomodal" refers to a feedstock that contains substantially one size of particle, whereas a "bimodal" feedstock contains two sizes of particles as characterized by exhibiting a continuous probability distribution having two different modes (that is, two tomically heterogeneous and contained substantially equal amounts by weight of cross-grain stalk (rind with pith attached) and leaf particles, along with about 5% tassel particles and inorganic grit. This corn stover CC data was relatively high, even though generated using half the sample size as in the wood experiments (5 g v. 10 g). Visual observation indicated that the fertilizer's blue-green color localized in the pith, which suggests that the pith adsorbed/released an abundant amount of the fertilizer ions. The grit component undoubtedly boosted the observed CC levels as well.

We observe generally from the Table 2 data that soluble fertilizer uptake and release as measured by CC is a useful comparative indicator of the skeletal surface areas of biomass particles. These data furthermore indicate that particle size, shape, and surface area to volume ratio affect the uptake and release of chemical ions. We conclude that such particle characteristics can be empirically modified and optimized for particular carrier purposes as, for example, described in the prior U.S. patent publications cited herein, all of which are hereby incorporated by reference in their entireties. We envision that the 2 mm×2 mm particle size is particularly suitable carrier for time release encapsulation following uptake of one or more biological agents, to provide a flowable product with high bulk density and uniform release rate.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. Particles of a plant biomass material coated with a biological agent, the particles being characterized by a length dimension (L) aligned substantially parallel to a grain direction and defining a substantially uniform distance along the grain, a width dimension (W) normal to L and aligned cross grain, and a height dimension (H) normal to W and L, wherein the L×H dimensions define a pair of substantially parallel side surfaces characterized by substantially intact longitudinally arrayed fibers, the W×H dimensions define a pair of substantially parallel end surfaces characterized by crosscut fibers and end checking between fibers, and the L×W dimensions define a pair of substantially parallel top and bottom surfaces.

2. The particles of claim 1, wherein L is aligned within 10° parallel to the grain direction.

3. The particles of claim 1, wherein L is aligned within 30° parallel to the grain direction.

4. The particles of claim 1, wherein L/H is 4:1 or less and wherein the top and bottom surfaces are characterized by surface checking between longitudinally arrayed fibers.

5. The particles of claim 1, wherein H does not exceed a maximum from 1 to 16 mm, W is between 1 mm and 1.5× the maximum H, and L is between 0.5 and 20× the maximum H.

6. The particles of claim 1, wherein L is between 4 and 70 mm, and each of W and H is equal to or less than L.

7. The particles of claim 1, characterized by size such that at least 80% of the particles pass through a ¼ inch screen having a 6.3 mm nominal sieve opening but are retained by a No. 10 screen having a 2 mm nominal sieve opening.

8. The particles of claim 1, characterized by size such that at least 90% of the particles pass through either:

an ¼ inch screen having a 6.3 mm nominal sieve opening but are retained by a ⅛-inch screen having a 3.18 mm nominal sieve opening;

a No. 4 screen having a 4.75 mm nominal sieve opening screen but are retained by a No. 8 screen having a 3.18 mm nominal sieve opening;

a ⅛-inch screen having a 3.18 mm nominal sieve opening but are retained by a No. 16 screen having a 1.18 mm nominal sieve opening;

a No. 10 screen having a 2.0 mm nominal sieve opening but are retained by a No. 35 screen having a 0.5 mm nominal sieve opening;

a No. 10 screen having a 2.0 mm nominal sieve opening but are retained by a No. 20 screen having a 0.85 mm nominal sieve opening; or, a No. 20 screen having a 0.85 mm nominal sieve opening but are retained by a No. 35 screen having a 0.5 mm nominal sieve opening.

9. The particles of claim 1, wherein the plant biomass is selected from among wood, agricultural crop residues, plantation grasses, hemp, bagasse, and bamboo.

10. The particles of claim 9, wherein the wood is a veneer.

11. The particles of claim 1, characterized by having a bimodal or multimodal size distribution.

12. The particles of claim 1, wherein the biological agent is a fungus and the plant biomass material is wood chips or corn stover.

13. Wood particles coated with a fungus, wherein the wood particles are characterized by a length dimension (L) aligned substantially parallel to a grain direction and defining a substantially uniform distance along the grain, a width dimension (W) normal to L and aligned cross grain, and a height dimension (H) normal to W and L, wherein the L×H dimensions define a pair of substantially parallel side surfaces characterized by substantially intact longitudinally arrayed fibers, the W×H dimensions define a pair of substantially parallel end surfaces characterized by a disrupted grain structure with prominent end and some surface checks, and the L×W dimensions define a pair of substantially parallel top and bottom surfaces.

* * * * *